United States Patent
Ding et al.

(10) Patent No.: US 9,778,497 B2
(45) Date of Patent: Oct. 3, 2017

(54) BEARING PLATFORM AND COF REPAIR BONDER

(71) Applicants: BOE TECHNOLOGY GROUP CO., LTD., Beijing (CN); Hefei Xinsheng Optoelectronics Technology Co., Ltd., Anhui (CN)

(72) Inventors: Hongjie Ding, Beijing (CN); Zhiyu Qian, Beijing (CN); Minghui Liu, Beijing (CN); Hanwei Tu, Beijing (CN); Long Cheng, Beijing (CN); Xiangzheng Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 0 days.

(21) Appl. No.: 14/801,942

(22) Filed: Jul. 17, 2015

(65) Prior Publication Data

US 2016/0147089 A1 May 26, 2016

(30) Foreign Application Priority Data

Nov. 21, 2014 (CN) .......................... 2014 1 0676446

(51) Int. Cl.
*B25B 11/00* (2006.01)
*G02F 1/13* (2006.01)

(52) U.S. Cl.
CPC .......... *G02F 1/1303* (2013.01); *B25B 11/005* (2013.01)

(58) Field of Classification Search
USPC ........................................ 269/9, 21, 71, 73
See application file for complete search history.

(56) References Cited

U.S. PATENT DOCUMENTS

2008/0127474 A1* 6/2008 McAllister ............. B23Q 1/035
29/33 K
2011/0062641 A1* 3/2011 Sato ..................... B65G 49/061
269/21

(Continued)

FOREIGN PATENT DOCUMENTS

CN 101179923 5/2008
CN 102006757 4/2011

(Continued)

OTHER PUBLICATIONS

Office action from China Application No. 201410676446.6 dated Sep. 30, 2016.

*Primary Examiner* — Joseph J Hail
*Assistant Examiner* — Shantese McDonald
(74) *Attorney, Agent, or Firm* — Calfee, Halter & Griswold LLP

(57) ABSTRACT

A bearing platform and a COF repair bonder are disclosed. The bearing platform has adjustable size and good practicability. Therefore, the designed volume of the COF repair bonder and its weight can be reduced, thereby saving space and being easier to move. The bearing platform includes a fixed part and at least one extension which is connected to the fixed part and can move back and forth in a first direction relative to the fixed part. Upper surfaces of the extension and the fixed part can be provided with at least one extension arm support for carrying a display panel respectively. Each extension arm support can move back and forth in a second direction relative to the fixed part, with the first direction and the second direction intersecting one another.

20 Claims, 3 Drawing Sheets

(56) References Cited

U.S. PATENT DOCUMENTS

| | | | |
|---|---|---|---|
| 2011/0180218 A1 | 7/2011 | Ciliberti et al. | |
| 2012/0242022 A1* | 9/2012 | Gagnon, Jr. | B25H 1/0007 269/9 |
| 2013/0147101 A1* | 6/2013 | Cho | B25J 15/0616 269/21 |

FOREIGN PATENT DOCUMENTS

| | | |
|---|---|---|
| CN | 102455606 | 5/2012 |
| CN | 102958316 | 3/2013 |
| JP | 2008132422 | 6/2008 |

* cited by examiner

BEARING PLATFORM AND COF REPAIR BONDER

RELATED APPLICATIONS

The present application claims the benefit of Chinese Patent Application No. 201410676446.6, filed on Nov. 21, 2014, the entire disclosure of which is incorporated herein by reference.

FIELD

The present disclosure relates to the technical field of display, and more particularly to a bearing platform and a COF (chip on film) repair bonder.

BACKGROUND

With continuous development of display technology, the sizes of the display panels are increasing, and tend to be more and more oversized.

Conventionally, in the preparation and repairing process of a liquid crystal panel, there are some steps such as: connecting a glass substrate and a chip by a chip on film repair bonder (COF repair bonder); and connecting a printed circuit board and the glass substrate through a flexible circuit board by the COF repair bonder. In these steps, there are several problems, such as: the glass substrates need to be placed onto the bearing platform of the COF repair bonder; the size of the bearing platform is fixed, which cannot fulfill the function of supporting glass substrates with various sizes; thus the practicability of the repair bonder is poor, if the bearing platform is set too large, the whole volume of the COF repair bonder will be large and heavy, which is not convenient to move.

SUMMARY

In light of this, the present disclosure provides a bearing platform. The platform has adjustable size and good practicability.

Additionally, the present disclosure also provides a COF repair bonder, which has high practicability and small volume, thereby is convenient to move.

In order to achieve the above exemplary objectives, the present disclosure provides a bearing platform which includes: a fixed part; and at least one extension which is connected to the fixed part and can move back and forth in a first direction relative to the fixed part, wherein upper surfaces of each extension and the fixed part are provided with at least one extension arm support for carrying a display panel respectively, wherein each extension arm support can move back and forth in a second direction relative to the fixed part, and wherein the first direction and the second direction intersect.

The bearing platform provided by the present disclosure can move the extension and the extension arm support according to the display panel disposed on the bearing platform, in order to lengthen and/or widen the bearing platform and increase the supporting area of the bearing platform so that the bearing platform can support larger display panels. Meanwhile, the bearing platform can also retract when it does not need to support a large display panel.

Therefore, the present disclosure provides a bearing platform. The platform has adjustable size and good practicability. Thereby, the designed volume of the COF repair bonder and its weight can be reduced, which can save space and is convenient to move.

In some exemplary embodiments, the first direction and second direction are perpendicular to each other.

In some exemplary embodiments, the fixed part is provided with at least one first slider extending along the first direction, and each first slider is fixed relative to the bearing platform;

Each extension is provided with a first groove which is in sliding fit with the first slider, each extension can move back and forth along the first direction relative to the first slider. By providing the first slider and the first groove, each extension can be convenient to move. The above described first groove provided in the extension extends along the thickness direction of the extension, wherein the thickness direction of the extension is perpendicular to the first direction and second direction.

In some exemplary embodiments, the fixed part is provided with at least one first slider extending along the first direction and each first slider is provided with a slide slot.

Each extension is provided with a projection which is in sliding fit with the slide slot of the first slider; each extension can slide relative to the first slider in order to move back and forth along the first direction.

In some exemplary embodiments, the upper surfaces of each extension and the fixed part are provided with second sliders corresponding to the extension arm support(s) one by one respectively; and each second slider extends along the second direction, each extension arm support is provided with a second groove which is in sliding fit with the second slider; each extension arm support can slide relative to the second slider in order to move back and forth along the second direction.

In some exemplary embodiments, the cross section of the fixed part is rectangular, the number of the extensions is two and the two extensions are opposite to each other along the first direction.

In some exemplary embodiments, each extension arm support comprises: two opposite sub-extension arms located at one side of the second slider (which is in sliding fit with the sub-extension arms) along the first direction respectively, and two of the sub-extension arms can move towards each other.

In some exemplary embodiments, a plurality of the second sliders can be spaced apart along the first direction, one of the second sliders is in the middle position of the fixed part along the first direction.

In some exemplary embodiment, the bearing surface of the sub-extension arm is provided with a plurality of vacuum suckers spaced apart. Each vacuum sucker can suck the display panel placed on it, which can have the function of fixing the display panel.

In some exemplary embodiments, the bearing surface of each sub-extension arm is provided with a plurality of elastic supports spaced apart, and the faces of the plurality of the elastic supports facing away from the sub-extension arms and the faces of the plurality of vacuum suckers facing away from the sub-extension arms are located at the same level. The elastic support can increase the support strength of the display screen.

In some exemplary embodiments, the bearing platform further comprises: locking devices for fixing each extension arm support relative to its cooperating second slider, and fixing each extension relative to the first slider. The locking devices can prevent the extension arm support and the extension continuing to move after reaching set position.

In some exemplary embodiments, the locking devices are locking screws. However, the above described locking devices can be other structure, such as locking straps, which will not be described in more detail.

In some exemplary embodiments, the above bearing platform further comprises: a sensor which is disposed on the bearing platform, and used to sense whether the display panel exists on the bearing platform. After the sensor senses that the display panel is placed onto the bearing platform, the entire COF repair bonder can be controlled to operate to bond.

In some exemplary embodiments, the bearing platform further comprises: drive devices for driving each extension and each extension arm support to move respectively, the drive devices are fixed relative to the fixed part.

Thus, the general inventive concepts contemplate that the extension and extension arm support(s) can be manually controlled to move or can be driven electronically.

In some exemplary embodiments, the drive devices are drive motors. However, the above mentioned drive devices can be other devices such as hydraulic motors, which will not be described in more detail.

In some exemplary embodiments, the bearing platform is provided with a graduated scale. The purpose of the graduated scale is to conveniently control the length of the extension and extension arm support.

The present disclosure relates to a COF repair bonder comprising: the bearing platform according to any of the above aspects. The platform has adjustable size and good practicability. Thereby, the designed volume of the COF repair bonder provided by the present disclosure and its weight can be reduced, which can save space and is convenient to move.

DETAILED DESCRIPTION

The features and technical solutions of the exemplary embodiments of the present disclosure will be more clearly and fully described in conjunction with drawings. Obviously, these exemplary embodiments are only some embodiments of the present invention and not all possible embodiments of the present invention. Based on the exemplary embodiments of the present disclosure, all other embodiments that would be recognized or otherwise appreciated by one of ordinary skill in the art without creative efforts belong to the scope of the present disclosure.

First Embodiment

Figure 1:
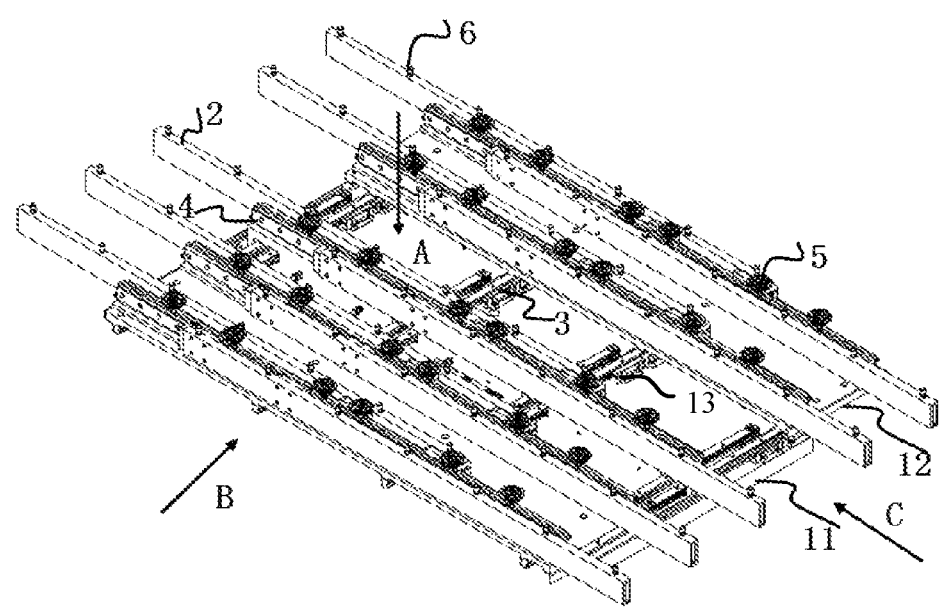
FIG. 1 is a schematic view showing the three-dimensional structure of a bearing platform provided by an exemplary embodiment of the present disclosure.
Figure 2:
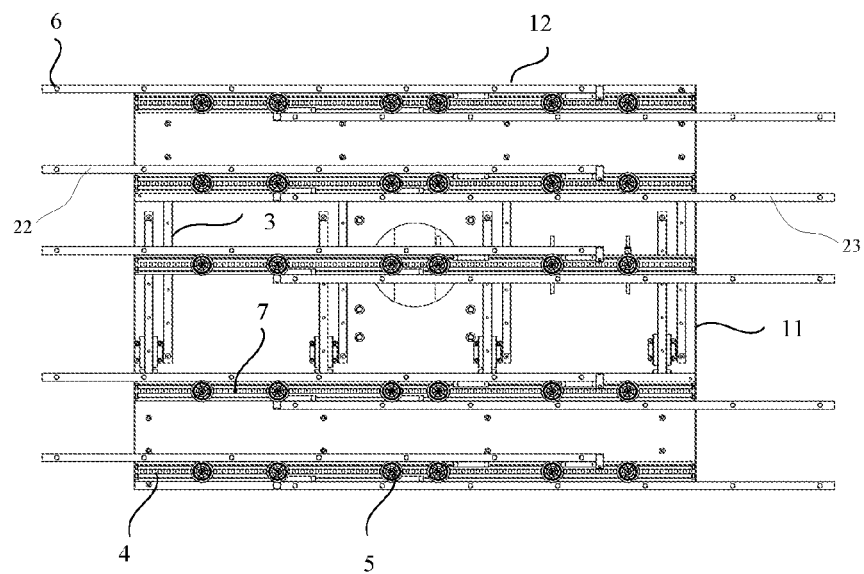
FIG. 2 is a schematic view showing the structure of the bearing platform shown in FIG. 1, when viewed in direction A.
Figure 3:
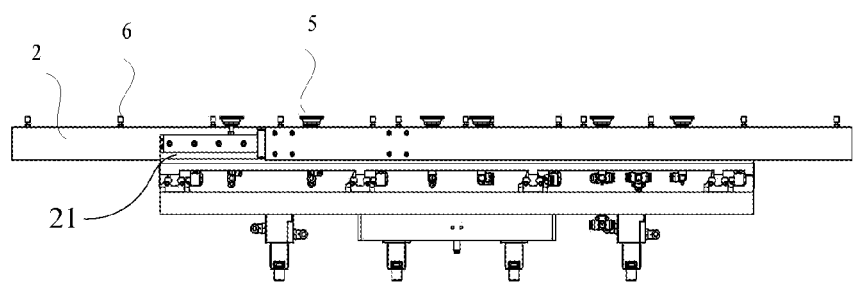
FIG. 3 is a schematic view showing the structure of the bearing platform shown in FIG. 1, when viewed in direction B.
Figure 4:
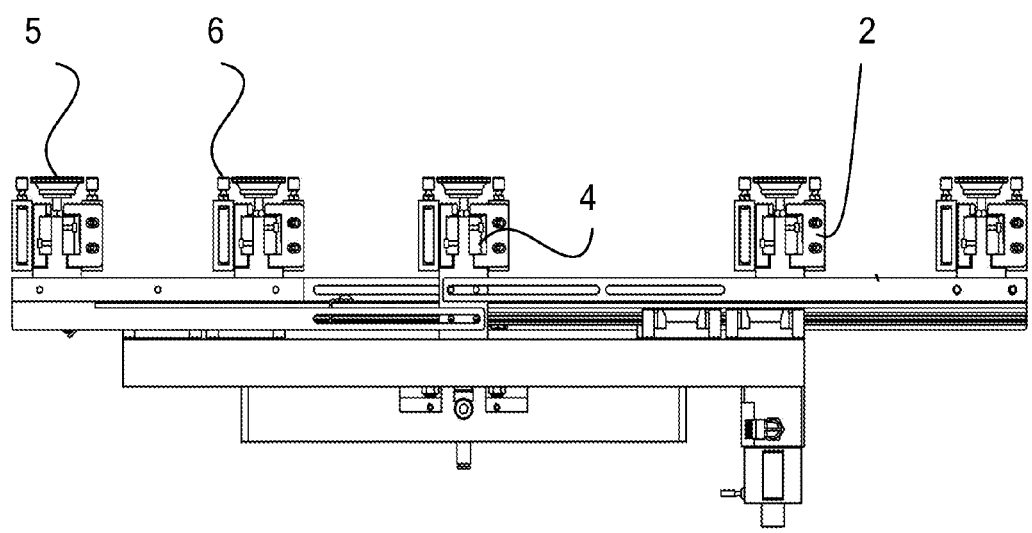
FIG. 4 is a schematic view showing the structure of the bearing platform provided shown in FIG. 1, when viewed in direction C.

As shown in FIG. 1, FIG. 2, FIG. 3, and FIG. 4, FIG. 1 is a schematic view showing the three-dimensional structure of a bearing platform provided by an exemplary embodiment of the present disclosure; FIG. 2 is a schematic view showing the structure of the bearing platform provided by the embodiment of the present disclosure along the direction A shown in FIG. 1; FIG. 3 is a schematic view showing the structure of the bearing platform provided by the embodiment of the present disclosure along the direction B shown in FIG. 1; and FIG. 4 is a schematic view showing the structure of the bearing platform provided by the embodiment of the present disclosure along the direction C shown in FIG. 1.

The bearing platform provided by the present embodiment, comprises: a fixed part 11; and at least one extension 12 which is connected to the fixed part 11 and can move back and forth in a first direction (as shown by the arrow direction B in FIG. 1) relative to the fixed part 11, wherein the upper surfaces of the extension 12 and the fixed part 11 can be provided with at least one extension arm support 2 for carrying a display panel respectively, wherein each extension arm support 2 can move back and forth in a second direction (as shown by the arrow direction C in FIG. 1) relative to the fixed part 11, and wherein the first direction and the second direction intersect.

In the bearing platform, a display panel can be placed onto the extension arm support, and the bearing platform can move the extension 12 and the extension arm support 2 according to the display panel disposed on the bearing platform, to lengthen and/or widen the bearing platform and increase the supporting area of the bearing platform. Therefore, the bearing platform can support a variety of display panels having different sizes including larger display panels. Meanwhile, the bearing platform can retract when it does not need to support large display panel.

In this way, the bearing platform has adjustable size and good practicability. Thereby, the designed volume of the COF repair bonder and its weight can be reduced, which can save space and is convenient to move.

The above described bearing platform can be used in the COF repair bonder; however, it can also be used in other equipment for producing display panels.

In a preferred exemplary embodiment, as shown in FIG. 1, the first direction and the second direction are perpendicular to each other.

The above mentioned extension and extension arm support can move back and forth relative to the fixed part in various ways. For example:

In some exemplary embodiments, the fixed part 11 is provided with at least one first slider 3 extending along the first direction; each extension 12 is provided with a groove which is in sliding fit with the first slider, each extension 12 can slide relative to the first slider 3 in order to move back and forth along a first direction. By providing the first slider 3 and the first groove 13, each extension 12 can be facilitated to move. The depth of the first groove 13 disposed in the extension 12 extends along the thickness direction of the extension 12; the length of the first groove 13 extends along the length direction of the extension 12, wherein the thickness direction of the extension 12 can be perpendicular to the first direction.

In some exemplary embodiments, the fixed part 11 is provided with at least one first slider 3 extending along the first direction and each first slider 3 is provided with a slide slot (not shown in the figures); each extension is provided with a projection (not shown in the figures) which is in sliding fit with the slide slot of the first slider 3; the extension 12 can slide relative to the first slider 3 to move back and forth along the first direction.

The upper surfaces of each extension 12 and the fixed part 11 are provided with second sliders 4 corresponding to the extension arm support(s) 2 one by one respectively; and each second slider 4 extends along the second direction, each extension arm support 2 is provided with a second groove 21 which is in sliding fit with the second slider 4; each extension arm support 2 can slide relative to the second slider 4 in order to move back and forth along the second direction.

Optionally, the cross section of the fixed part 11 is rectangular, the number of the extensions 12 is two and the two extensions 12 are opposite to each other along the first direction.

In some exemplary embodiments, each extension arm support 2 comprises two opposite sub-extension arms 22, 23, each sub extension arm 22, 23 is located at one side of the second slider along the first direction respectively, and two of the sub-extension arms can move towards each other. As shown in FIG. 4, each sub-extension arm is provided with a first groove along its length direction respectively.

In order to increase the supporting stability of the display panel by the bearing platform, as shown in FIG. 4, a plurality of the second sliders 4 are used, and the second sliders 4 can be spaced apart along the first direction. One second slider 4 is located at the middle position of the fixed part along the first direction. In a preferred exemplary embodiment, the number of the second sliders is five which can ensure the support stability of the bearing platform without excessively increasing the weight of the bearing platform.

In a preferred exemplary embodiment, the second sliders can be disposed in parallel, which can ensure the plurality of sub-extension arms are also in parallel.

Furthermore, the bearing surface of each sub-extension arm is provided with a plurality of vacuum suckers 5 spaced apart. The vacuum suckers 5 can suck the display panel placed on the vacuum suckers 5, which can fix the display panel.

Furthermore, the bearing surface of each sub-extension arm is also provided with a plurality of elastic supports 6 spaced apart. In some exemplary embodiments, the elastic supports 6 are spaced apart uniformly. The faces of the plurality of elastic supports 6 facing away the sub-extension arms and the faces of the plurality of the vacuum suckers 5 facing away the sub-extension arms are located at the same level. The elastic supports 6 can increase the supporting strength of the display screen.

In a preferred exemplary embodiment, the above mentioned bearing platform further comprises: locking devices for fixing each extension arm support 2 relative to its cooperating second slider 4, and fixing each extension 12 relative to the first slider 3. The locking devices can prevent the extension arm support and the extension from continuing to move after reaching a set position.

The specific structure of the above mentioned locking devices can vary. For example, in some exemplary embodiments, the locking devices are locking screws (not shown in the figures). However, the locking devices can also be other structure such as locking straps, which will not be described herein.

In some exemplary embodiments, the bearing platform further comprises: a sensor (not shown in the figures) disposed on the bearing platform which is operable to sense whether a display panel exists on the bearing platform. The entire COF repair bonder can be operated to bond after the sensor senses that the display panel has been placed onto the bearing platform.

In a preferred exemplary embodiment, the bearing platform further comprises: drive devices (not shown in the figures) for driving each extension 12 and each extension arm support 2 to move respectively. The drive devices are fixed relative to the fixed part 11. The above mentioned extension 12 and extension arm support 2 can also be manually controlled to move or can be driven electronically.

Optionally, the drive devices are drive motors. However, the above mentioned drive devices can be other devices such as hydraulic motors, which will not be described in more detail.

In some exemplary embodiments, in order to control the extending length of the extension 12 and the extension arm support 2, the bearing platform is provided with a graduated scale 7.

Second Embodiment

In another exemplary embodiment, a COF repair bonder is provided, the COF repair bonder comprising: any of the exemplary bearing platforms disclosed or suggested herein. The bearing platform has adjustable size and good practicability. Therefore, the designed volume of the COF repair bonder provided by the present disclosure and its weight can be reduced, which can save space and is convenient to move.

Obviously, the present disclosure can be varied and modified in various ways by those of ordinary skill in the art without departing from the spirit and scope of the present disclosure. In this sense, those variations and modifications are intended to be included by the present disclosure if these modifications and variations are within the scope of the claims of the present disclosure and their equivalents.

The invention claimed is:

1. A bearing platform, comprising:
   a fixed part; and
   at least one extension which is connected to the fixed part and can move back and forth in a first direction relative to the fixed part,
   wherein upper surfaces of each extension and the fixed part are provided with at least one extension arm support for carrying a display panel respectively,
   wherein each extension arm support can move back and forth in a second direction relative to the fixed part, and
   wherein the first direction and the second direction intersect,
   wherein each extension arm support comprises two opposite sub-extension arms that are capable of moving towards each other.

2. The bearing platform according to claim 1, wherein the first direction and second direction are perpendicular to each other.

3. The bearing platform according to claim 1, wherein the fixed part is provided with at least one first slider extending along the first direction,
   wherein each extension is provided with a first groove which is in sliding fit with the first slider, and
   wherein each extension can move back and forth along the first direction relative to the first slider.

4. The bearing platform according to claim 1, wherein the fixed part is provided with at least one first slider extending along the first direction and each first slider is provided with a slide slot,
   wherein each extension is provided with a projection which is in sliding fit with the slide slot of the first slider, and
   wherein each extension can slide relative to the first slider to move back and forth along the first direction.

5. The bearing platform according to claim 1, wherein the upper surfaces of each extension and the fixed part are provided with a second slider corresponding to each of the extension arm supports,
- wherein each second slider extends along the second direction,
- wherein each extension arm support is provided with a second groove which is in sliding fit with the second slider, and
- wherein each extension arm support can slide relative to the second slider to move back and forth along the second direction.

6. The bearing platform according to claim 5, wherein the cross section of the fixed part is rectangular, and
- wherein the number of the extensions is two, and
- wherein the two extensions are opposite to each other along the first direction.

7. The bearing platform according to claim 6,
- wherein each of the sub-extension arms is located at one side of the second slider along the first direction respectively.

8. The bearing platform according to claim 7, wherein the bearing platform includes a plurality of the second sliders,
- wherein the second sliders are spaced apart along the first direction, and
- wherein one of the second sliders is in a middle position of the fixed part along the first direction.

9. The bearing platform according to claim 8, wherein a bearing surface of the sub-extension arm is provided with a plurality of vacuum suckers.

10. The bearing platform according to claim 9, wherein the bearing surface of the sub-extension arm is provided with a plurality of elastic supports, and
- wherein faces of the elastic supports facing away from the sub-extension arms and faces of the vacuum suckers facing away from the sub-extension arms are located at the same level.

11. The bearing platform according to claim 5, further comprising locking devices for fixing each extension arm support relative to its cooperating second slider, and fixing each extension relative to the first slider.

12. The bearing platform according to claim 11, wherein the locking devices are locking screws.

13. The bearing platform according to claim 1, further comprising a sensor disposed on the bearing platform, wherein the sensor senses whether the display panel exists on the bearing platform.

14. The bearing platform according to claim 1, further comprising drive devices for driving each extension and each extension arm support to move respectively, wherein the drive devices are fixed relative to the fixed part.

15. The bearing platform according to claim 14, wherein the drive devices are drive motors.

16. The bearing platform according to claim 1, wherein the bearing platform is provided with graduated scale.

17. A COF repair bonder, comprising a bearing platform, the bearing platform comprising:
- a fixed part; and
- at least one extension which is connected to the fixed part and can move back and forth in a first direction relative to the fixed part,
- wherein upper surfaces of each extension and the fixed part are provided with at least one extension arm support for carrying a display panel respectively,
- wherein each extension arm support can move back and forth in a second direction relative to the fixed part, and
- wherein the first direction and the second direction intersect,
- wherein each extension arm support comprises two opposite sub-extension arms that are capable of moving towards each other.

18. The COF repair bonder according to claim 17, wherein the fixed part is provided with at least one first slider extending along the first direction,
- wherein each extension is provided with a first groove which is in sliding fit with the first slider, and
- wherein each extension can move back and forth along the first direction relative to the first slider.

19. The COF repair bonder according to claim 17, wherein the fixed part is provided with at least one first slider extending along the first direction and each first slider is provided with a slide slot,
- wherein each extension is provided with a projection which is in sliding fit with the slide slot of the first slider, and
- wherein each extension can slide relative to the first slider to move back and forth along the first direction.

20. The COF repair bonder according to claim 17, wherein the upper surfaces of each extension and the fixed part are provided with a second slider corresponding to each of the extension arm supports,
- wherein each second slider extends along the second direction,
- wherein each extension arm support is provided with a second groove which is in sliding fit with the second slider; and
- wherein each extension arm support can slide relative to the second slider to move back and forth along the second direction.

* * * * *